United States Patent [19]

Yamamoto et al.

[11] E Re. 30,897

[45] Reissued Apr. 6, 1982

[54] ELECTROPHOTOGRAPHIC COPYING APPARATUS WITH GAS EVACUATING MEANS

[75] Inventors: Shunji Yamamoto, Shinshiro; Koji Imaizumi; Takashi Hikosaka, both of Aichi, all of Japan

[73] Assignee: Minolta Camera Kabushiki Kaisha, Osaka, Japan

[21] Appl. No.: 162,610

[22] Filed: Jun. 24, 1980

Related U.S. Patent Documents

Reissue of:

[64] Patent No.: 4,178,092
Issued: Dec. 11, 1979
Appl. No.: 814,831
Filed: Jul. 11, 1977

U.S. Applications:

[62] Division of Ser. No. 631,463, Nov. 12, 1975, abandoned.

[30] Foreign Application Priority Data

Nov. 30, 1974 [JP] Japan ..... 49-137974
Dec. 4, 1974 [JP] Japan ..... 49-139735
Jan. 16, 1975 [JP] Japan ..... 50-8147

[51] Int. Cl.[3] ..... G03G 15/00

[52] U.S. Cl. ..... 355/3 R; 98/1; 98/115 R; 250/324; 355/3 CH

[58] Field of Search ..... 355/3 R, 3 CH, 15, 30; 361/225; 250/324–326; 98/1, 115 R

[56] References Cited

U.S. PATENT DOCUMENTS

| | | | |
|---|---|---|---|
| 3,324,291 | 6/1967 | Hudson | 250/324 X |
| 3,332,328 | 7/1967 | Roth | 427/20 X |
| 3,382,360 | 5/1968 | Young et al. | 355/3 CH |
| 3,386,365 | 6/1968 | Jensen | 98/36 |
| 3,777,158 | 12/1973 | Kamogawa et al. | 250/324 |
| 3,936,184 | 2/1976 | Tanaka et al. | 355/15 |

FOREIGN PATENT DOCUMENTS

| | | | |
|---|---|---|---|
| 2302302 | 7/1973 | Fed. Rep. of Germany | 355/15 |

*Primary Examiner*—Richard L. Moses
*Attorney, Agent, or Firm*—Wenderoth, Lind & Ponack

[57] ABSTRACT

An electrophotographic copying apparatus which includes a rotatable photoreceptor member having a photoconductive surface for repeated formation of an electrostatic latent image of an original thereon. A casing is disposed around the photoreceptor member and included a corona charger for uniformly charging the surface. An exposure device is provided for exposing the charged surface to image light of the original through an optical assembly including an illuminating light source so as to form the electrostatic latent image of the original thereon. A system is provided for eliminating harmful gases generated by the corona charger disposed within the copying apparatus.

4 Claims, 11 Drawing Figures

ELECTROPHOTOGRAPHIC COPYING APPARATUS WITH GAS EVACUATING MEANS

Figure 1:
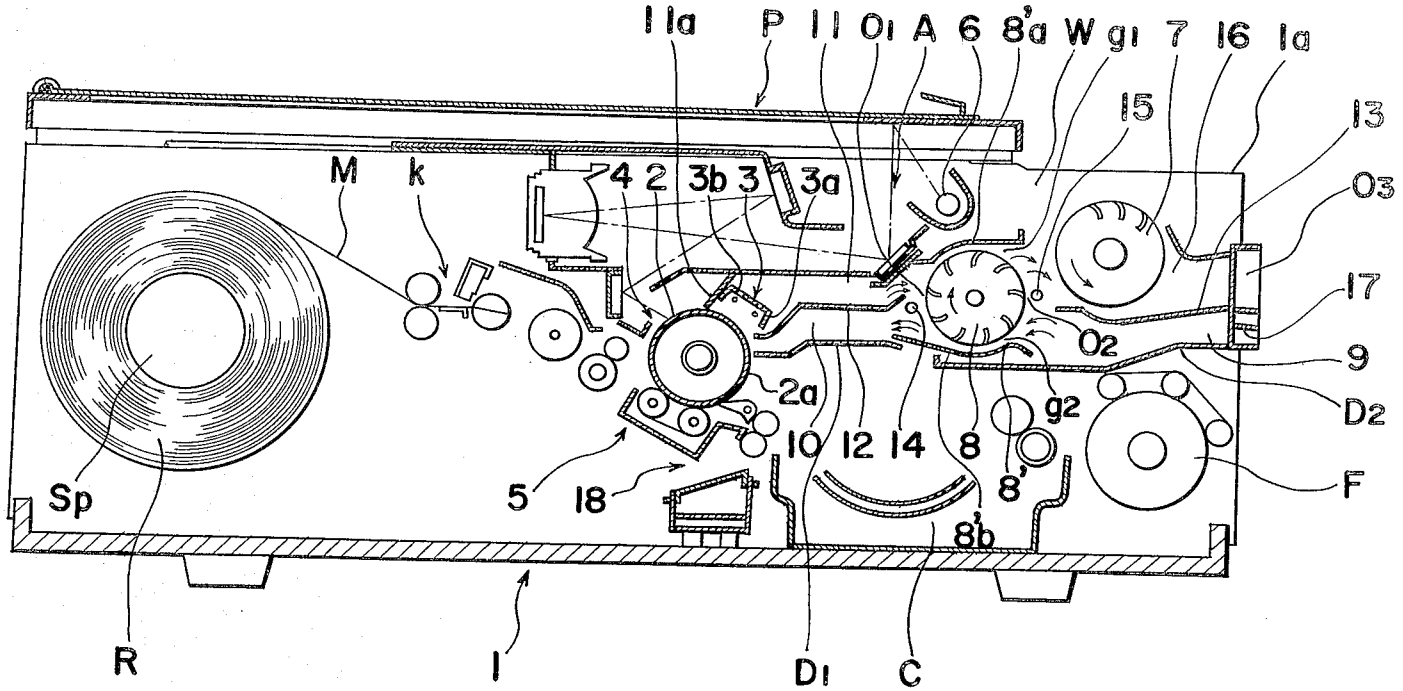

Matter enclosed in heavy brackets [ ] appears in the original patent but forms no part of this reissue specification; matter printed in italics indicates the additions made by reissue.

CROSS REFERENCE TO RELATED APPLICATIONS

This application is a division of Ser. No. 631,463, filed Nov. 12, 1975 and now abandoned.

The present invention relates to an electrophotographic copying apparatus and, more particularly, to a transfer type electrophotographic copying apparatus provided with a transferred-image-disturbance prevention device incorporated therein.

Conventionally, in the copying apparatus based on a copying system known as the Carlson system, there are employed an electrophotosensitive photoreceptor in the configuration of a drum or an endless belt having thereon an organic photoconductive layer of polyvinyl carbazole (PVK), an inorganic photoconductive layer of CdS (Cadmium Sulfide) or the like, and a corona charger for preliminarily charging the photoconductive layer so as to form an electrostatic latent image thereon through illumination of the original by a light source and projection of image light of the original onto the photoconductive layer via an optical system. Subsequently, for example, the latent image thus formed is then transferred onto copy paper at a transfer station, which copy paper bearing the transferred latent image is subsequently developed at a developing device of a dry type or wet type to form a visible toner image thereon and finally fixed at a fixing device and discharged out of the apparatus.

The conventional electrophotographic copying apparatus of the above described type, however, has such disadvantages that the harmful gases such as ozone and nitrogen oxides arising from corona discharge of the corona charger accumulate around the corona charger during repeated use of the copying apparatus, which harmful gases gradually deteriorate the surface of the photoconductive layer, thus resulting in disorder or disturbance of the copies images.

In order to eliminate such disadvantages, there has conventionally been proposed a transferred-image-disturbance prevention device in which the harmful gases present within the corona charger are forcibly drawn by a fan or the like through an opening formed in the upper portion of the corona charger for reducing density of the harmful gases around the photoreceptor surface, which prevention device, however, still has such disadvantages there, since the same is adapted to suck in the air within the apparatus housing, vapor of organic solvent medium in the developing solution is sucked in when the wet-type developing device is employed, while heated air around the fixing device is sucked in in cases where the dry-type developing is employed. Accordingly, such vapor or heated air inevitably contacts the photoreceptor surface, causing the latter to deteriorate in the course of time. On the other hand, the photoreceptor surface, once deteriorated, tends to easily absorb moisture, and after the same has been left in a high-humidity atmosphere for a long period of time, for example, during nights or holidays, the quality of the electrostatic latent image formed thereon is greatly deteriorated at the initiation of the copying operation due to reduction of the charge holding capacity on the photoconductive layer, resulting in disorder or disturbance of the copies images. Although the details of the process of the deterioration of the photoreceptor surface due to such harmful gases or reaction products arising from the corona discharge is not clear, it is considered that such deterioration is mainly attributable to clouding or corrosion on the surfaces of the optical system elements and the photoreceptor surface due to sticking of gases formed through the reaction of ionized gases such as O, NO, $NO_2$ and the like with $H_2O$ in the air, which trend is especially conspicuous when the apparatus is operated continuously for a long period of time.

Meanwhile, it is known that the reaction products of the ordinary corona discharge chiefly include ozone ($O_3$) with a very small amount of the nitrogen oxides NO and $NO_2$, of which products, ozone is particularly harmful to the human body to such an extent that if ozone of 1 to 2 p.p.m. in density is inhaled for one to two hours, the mucous is strongly irritated, thus causing diseases such as headache, bronchitis, inflammation around the bronchus or the like.

For the elimination of such undesirable effects on the human body and also on the optical system including the photoreceptor, there has also been proposed heretofore a device in which the harmful gases in the vicinity of the corona charger are drawn out of the apparatus housing through a discharge opening which is provided with a filter for decomposing or absorbing the reaction products in the harmful gases, which device, however, still has disadvantages in that since the same absorbs the air within the apparatus housing for discharging the same out of the housing, toner particles have very small diameters pass through the filter without being removed thereby when the dry-type developing device is employed, or the heated air around the fixing device is undesirably drawn out, producing a bad effect on the photoreceptor surface, or the vapor of the organic solvent medium of the developing solution is sucked in to deteriorate the filter performance in cases where the wet-type developing device is employed, with a considerable amount of the reaction products being discharged out of the apparatus housing without having been sufficiently absorbed and decomposed.

Accordingly, an essential object of the present invention is to provide an electrophotographic copying apparatus in which the surface of a photoconductive layer of a photoreceptor is maintained in a dry condition through employment of a heating device for obtaining clear and definite copied images even at the initiation of the copying operation.

Another important object of the present invention is to provide an electrophotographic copying apparatus of the above described type which is further equipped with an improved transferred-image-disturbance prevention device for continuously discharging harmful gases from a corona charger out of the apparatus so as to protect a photoreceptor surface and also a human body from effects of harmful gases or heated air with substantial elimination of the disadvantages inherent in the conventional copying apparatus.

A further object of the present invention is to provide an electrophotographic copying apparatus of the above described type which is simple in construction and accurate in functioning and which has a compact size and low manufacturing cost.

According to a preferred embodiment of the present invention, the copying apparatus is provided with a transferred-image-disturbance prevention device which includes a first air duct disposed between the photoreceptor surface and a first fan, a second air duct provided between a second fan located adjacent to said first fan and a discharge opening of the apparatus housing, and a heating unit disposed below and adjacent to the photoreceptor surface. The first and second ducts are each divided into an ejection duct and a suction duct by a partition plate disposed therein to form a circulation path for the air stream through the discharge opening and the first and second ducts, with the corona charger being enclosed within one open end of a suction passage of the first duct for efficiently evacuating harmful gases in and around the corona charger out of the apparatus housing, while the heating unit heats the photoreceptor surface at a comparatively low temperature through heat radiation therefrom for maintaining the photoreceptor surface in a dry condition, by which arrangement, not only the gradual deterioration of the photoreceptor surface due to harmful gases and heat is prevented, but clear and definite copied images without disorder or disturbance can be obtained even at an initiation of the copying operation after a long period of suspension.

Figure 2:
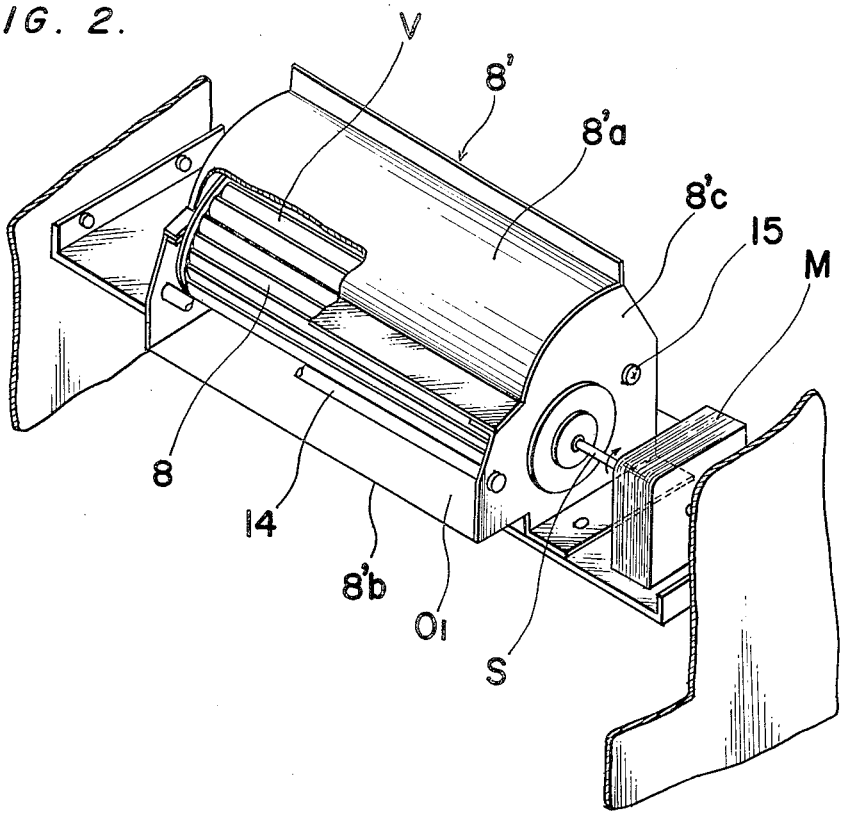
Figure 3:
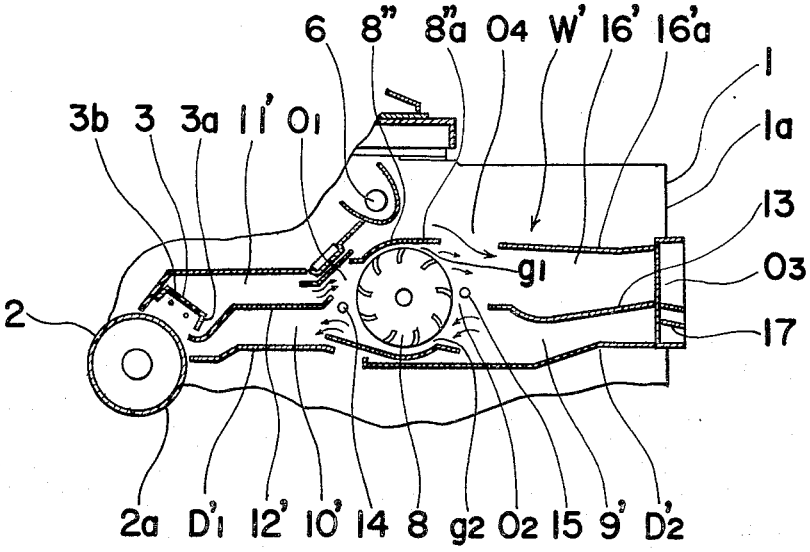
Figure 4:
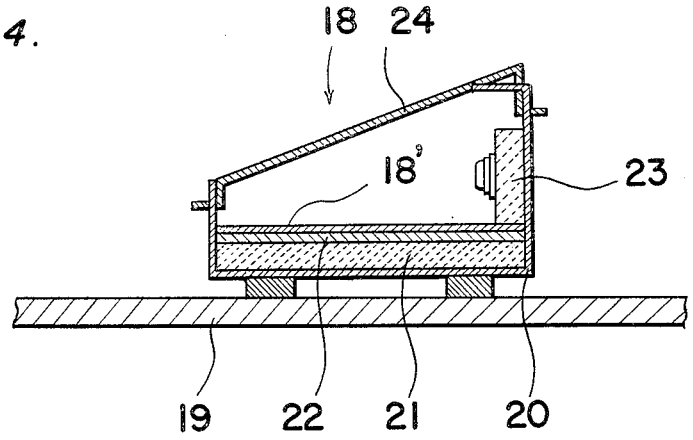
Figure 5:
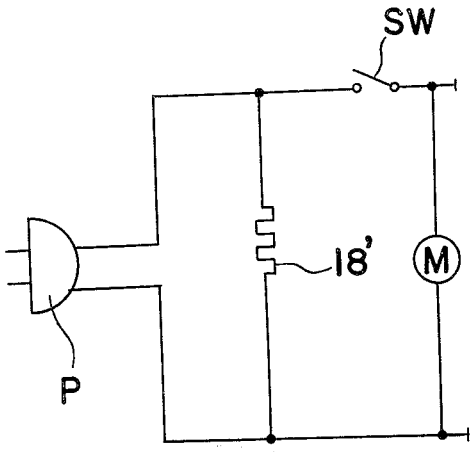
Figure 6:
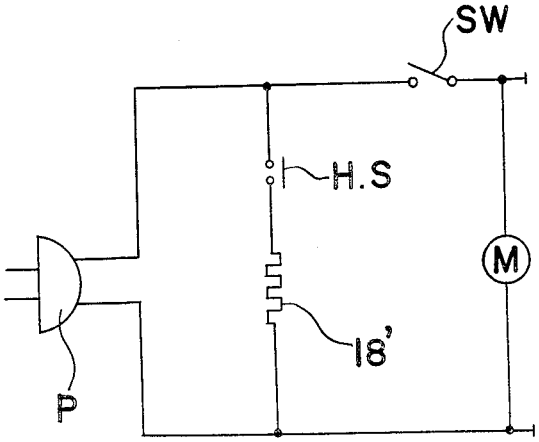
Figure 7:
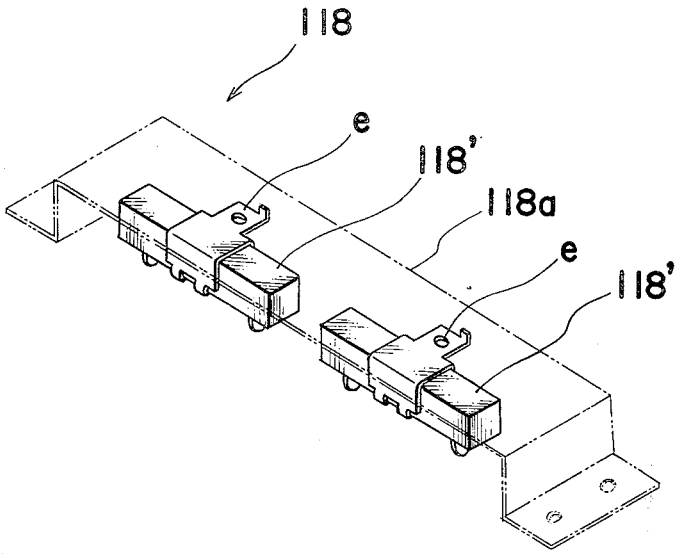
Figure 8:
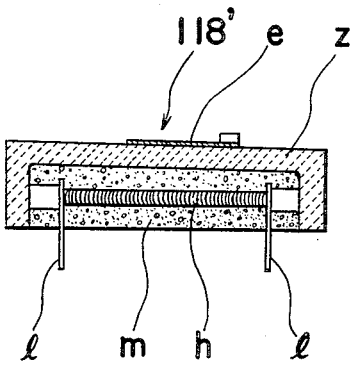
Figure 9:
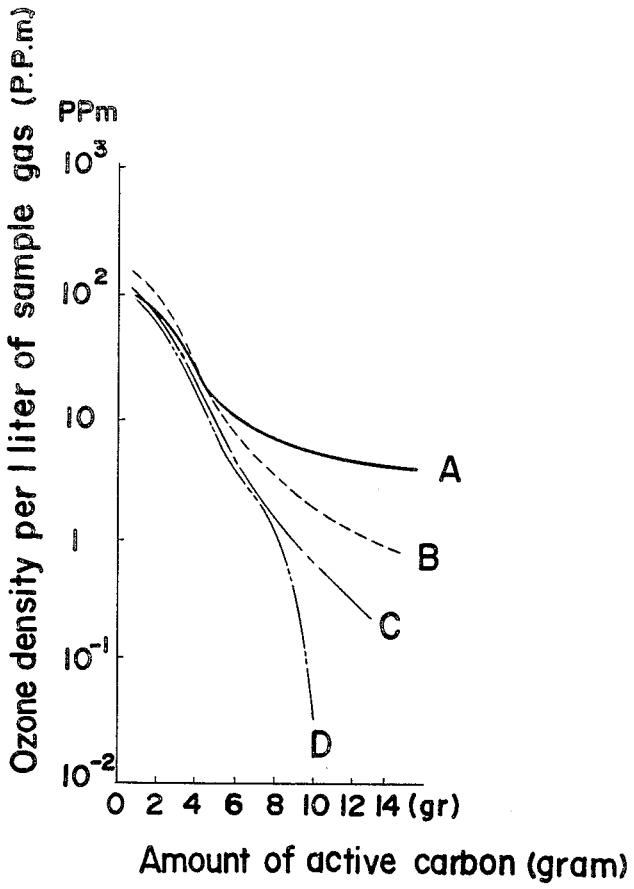
Figure 10:
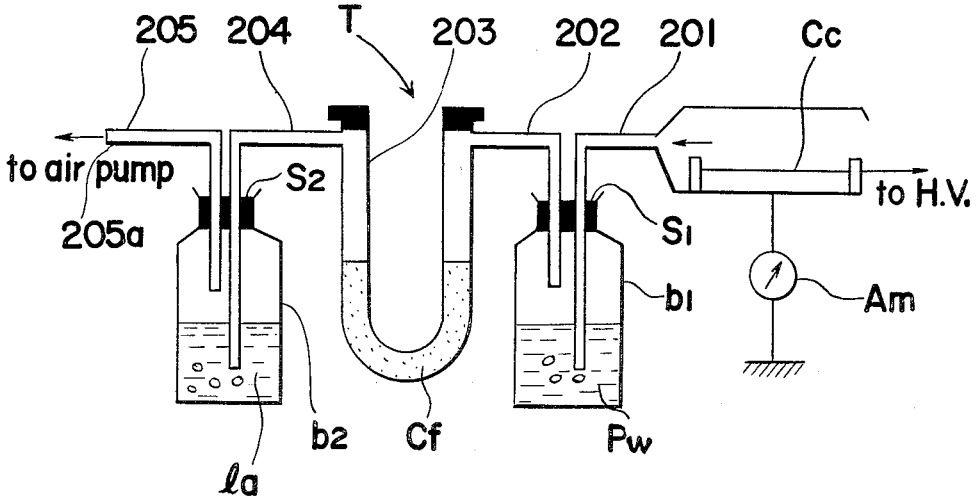
Figure 11:
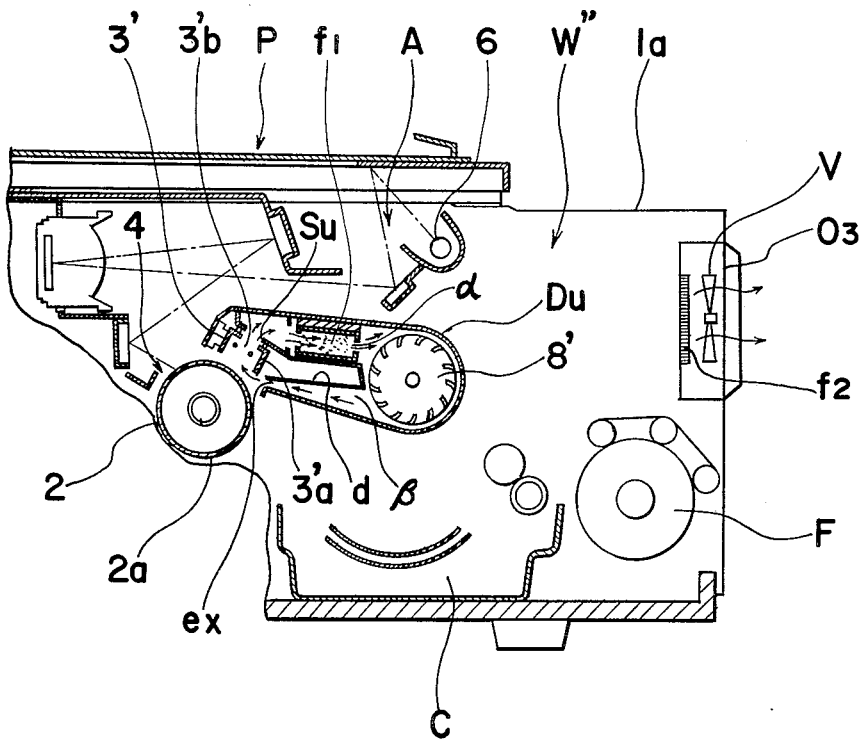

These and other objects and features of the present invention will become apparent from the following description taken in conjunction with the preferred embodiment thereof with reference to the attached drawings, in which:

FIG. 1 is a schematic diagram showing a sectional side view of a copying apparatus according to a preferred embodiment of the present invention, FIG. 2 is a perspective view partly in section showing, on an enlarged scale, construction of a fan incorporated in the apparatus of FIG. 1, FIG. 3 is a schematic side sectional view showing an essential part of a modification of a transferred image disturbance prevention device incorporated in the apparatus of FIG. 1, FIG. 4 is a schematic side sectional view showing, on an enlarged scale, a heating unit incorporated in the apparatus of FIG. 1, FIG. 5 is an electric circuit diagram showing connections of the heating unit of FIG. 4, FIG. 6 is a similar view to FIG. 5, but particularly shows a modification thereof, FIG. 7 is a perspective view showing, on an enlarged scale, a modification of the heating unit of FIG. 4, FIG. 8 is a cross sectional view, showing on an enlarged scale, construction of a heating element employed in the heating unit of FIG. 7, FIG. 9 is a graph explanatory of the effect of organic solvent medium vapor on a filter of active carbon, FIG. 10 is a schematic view of a testing device employed for the assessment of the effect of organic solvent medium vapor on the filter of active carbon, and FIG. 11 is a similar view to FIG. 3, but particularly shows a modification thereof.

Before the description of the present invention proceeds, it is to be noted that like parts are designated by like numerals throughout several views of the accompanying drawings.

Referring to FIG. 1, there is shown an electrostatic latent image transfer type electrophotographic copying apparatus utilizing a wet developing system according to the invention. The copying apparatus 1 generally comprises a movable platform P horizontally, reciprocatingly supported at the upper portion of the apparatus housing 1a for receiving an original (not shown) to be copied thereon, and a photoreceptor drum 2 having, on the outer periphery thereof, a photoconductive layer 2a of organic material, for example, of PVK (polyvinyl carbazole) or of inorganic material such as CdS (cadmium sulfide) and rotatably supported approximately in the central portion of the apparatus housing 1a so as to cause the photoconductive surface 2a to sequentially pass various processing stations disposed therearound, such as a corona charging station provided with a corona charger 3 for preliminarily charging the photoconductive surface 2a uniformly, which corona charger 3 includes a casing 3a having an opening 3b directed toward the preliminarily charged photoconductive surface 2a and a corona wires disposed in the casing 3a, an exposure station 4 for projecting a light image of the original onto the charged photoconductive surface 2a for forming a latent image of the original on the surface 2a repeatedly, through a light source 6 for illuminating the original and an optical system A including a reflecting mirror and lens assembly, and a transfer station 5 for transferring the latent image formed on the photoconductive surface 2a onto transfer material M or copy paper which is fed from a paper roll R supported on a rotatable spool Sp through a plurality of feeding rollers. After the transfer, the copy paper cut to a predetermined length by a cutter device k is fed into a developing device C of the wet developing process type, with subsequent fixing of developed image thereon at a fixing device F, and is then discharged out of the apparatus housing 1a in a known manner.

It should be noted that the above described arrangement of the copying apparatus 1 is conventional except for the provision of a transferred image disturbance prevention device W including a heating unit 18 incorporated therein, which device W and unit 18 directly related to the present invention are described in detail hereinbelow.

The prevention device W is intended to prevent disturbance or disorder of the transferred image resulting from gradual deterioration of the photoconductive surface 2a due to accumulation of harmful gases such as ozone, nitrogen oxides and the like which are generated following the corona discharge by the corona charger 3, and generally includes an air duct $D_1$ disposed between the photoreceptor surface 2a and a fan 8, described later, another air duct $D_2$ provided between a fan 7 and a louver 17 attached to an opening $O_3$ formed in the apparatus housing 1a for preventing mixture of the exhaust air with the suction air, and the heating unit 18 described later which is fixedly disposed below the photoreceptor drum 2. The fan 7 rotatably disposed adjacent to the fan 8 is for discharging heat from the light source 6. The duct $D_1$ is divided into a suction duct 10 and an exhaust duct 11 by a partition plate 12 provided within the duct $D_1$, with one end of the duct 11 facing the photoreceptor surface 2 being arranged to enclose the corona charger 3 therein by an air flow shielding plate 11a which extends downwardly toward the photoreceptor surface 2a from the upper wall of the duct 11 and to which one side wall of the casing 3a of the corona charger 3 is secured, while the other end of the duct $D_1$ is in communication with a casing 8' in which the fan 8 is rotatably housed in a manner described later. The air duct $D_2$ is also divided into suction duct 9 and an exhaust duct 16 by a partition plate 13, with the fan 7 rotatably disposed adjacent to one end of the exhaust duct 16 remote from the opening $O_3$.

It should be noted here that the air duct $D_1$ and $D_2$ which are divided, by the partition plates 12 and 13, into the suction ducts 9 and 10 and the exhaust ducts 11 and 16 respectively constitute an evacuating means having an air circulation path which includes a suction path and an exhaust path communicating with each other through the opening 3b of the charger casing 3a for removing the harmful gases within and around the charger 3, without directly drawing in the air in the apparatus housing 1a.

Referring to FIG. 2, the fan 8 of a cylindrical configuration extending across the width of the duct $D_1$ and $D_2$ is provided with many vanes V of arcuate cross section extending radially outwardly from the peripheral surface thereof and is fixedly mounted on a shaft S rotatably supported by side walls 8'c of the casing 8' on corresponding bearings, with one end of the shaft S being connected to a driving motor M which is fixedly mounted on a frame of the apparatus housing 1a.

The casing 8' further includes arcuate upper and lower walls 8'a and 8'b secured to the side walls 8'c to define openings $O_1$ and $O_2$ for th casing 8' facing the corresponding ends of the duct $D_1$ and $D_2$, and air flow separator rods 14 and 15 fixedly supported by the side walls 8'c at the central portions of the openings $O_1$ and $O_2$ respectively, with the upper and lower walls 8'a and 8'b being spaced from the outer periphery of the fan 8 to provide passages $g_1$ and $g_2$ therebetween, thus suction and exhaust air flow circulation paths being formed from the louver 17, through the duct 9 of the duct $D_1$, the passage $g_2$, the duct 10 and the duct 11 of the duct $D_1$, the passage $g_1$, the duct 16 of the duct $D_2$, and back to the louver 17.

By this arrangement, when a main switch (not shown) is turned on for carrying out a copying operation, the fan 8 is rotated through energization of the motor M, and the outside air is sucked in through the louver 17 into the suction duct 9. The outside air thus taken into the duct 9 is subsequently blasted toward the corona charger 3 through the passage $g_2$ and the duct 10, and is subsequently led into the duct 11 through the openings 3b of the charger casing 3a and through a space formed between the casing 3a and the partition plate 12, from which duct 11, the air together with the air heated air by the light source 6 is discharged through the duct 16 and the louver 17 by the combined effect of the fans 8 and 7.

It should be noted here that the entire air stream ejected from the duct 10 passes through the interior of the corona charger 3 without flowing toward the mirror or the like in the vicinity of the exposure station 4 by the suction in the duct 11 and the presence of the air flow shielding plate 11a, so that harmful gases such as ozone, nitrogen oxides, etc., in the corona charger 3 of thereabouts can efficiently be discharged out of the apparatus housing 1a together with the heated air in the vicinity of the light source 6.

As is clear from the above description, according to the device W of the invention, since the air around the corona charger 3 is forcibly discharged out of the apparatus, while fresh outside air is positively introduced toward the charger 3 mainly by the fan 8, efficient air circulation is achieved with marked improvement in the elimination of the harmful gases as compared with conventional devices wherein air around the corona charger is discharged through a fan together with air inside of the copying apparatus. Furthermore, in the device W of the invention, most of the air drawn through the duct 11 is introduced through the suction duct 10, with the air inside the copying apparatus being scarcely mixed therewith, so that organic solvent medium vapor of the developing solution and heated air in the fixing device are not drawn by the air stream through the duct 10, thus deterioration of the photoreceptor surface due to such vapor and heat being advantageously eliminated.

Referring to FIG. 3, there is shown a modification of the prevention device W of FIG. 1. In this modification W', the fan 7 for discharging the air heated by the light source 6 described as employed in the embodiment of FIG. 1 is dispensed with, and an opening $O_4$ is formed between one edge of the upper wall 8''a of the casing 8'' and the corresponding edge of the upper wall 16'a of the exhaust duct 16' with the wall 16'a extending approximately horizontally toward the upper wall 8''a of the casing 8''.

In the above arrangement of the modification of FIG. 3, when the fan 8 is rotated upon closure of the main switch (not shown), the outside air is drawn into the suction duct 9' through the louver 17, and subsequently directed toward the corona charger 3 through the passage $g_2$ and the duct 10'. The air conditioning therein the harmful gases present around the corona charger 3 is further drawn into the duct 11' of the duct $D'_1$ through the openings 3b formed in the casing 3a of the corona charger 3 and the space provided between the casing 3a and the partition plate 12', and then sucked into the exhaust duct 16' of the duct $D'_2$, in which case, the heated air around the light source 6 is also drawn into the exhaust duct 16' through the opening $O_4$ and discharged out of the apparatus housing 1a through the louver 17 together with the air circulating through the ducts $D'_2$ and $D'_1$ in the above described manner, thus the fan 7 required in the embodiment of FIG. 1 being advantageously dispensed with.

Other functions and construction of the copying apparatus 1 are similar to those in the embodiment of FIG. 1, so that the description thereof is omitted for brevity.

It should be noted here that the single fan or so-called line fan 8 capable of sucking in and discharging air through the two paths in the ducts described as employed in the above devices of FIGS. 1 and 3 is not limited to a single one, but a separate fan may be provided exclusively for each of the suction and exhaust paths of the ducts, although adoption of such a single fan results in reduction of manufacturing cost and compact size of the copying apparatus.

It should also be noted here that, since very efficient air circulation is achieved by the device of the invention, air flow described as directed from the side of the photoreceptor surface toward the corona charger in FIGS. 1 and 3 may be reversed to flow from the corona charger toward the photoreceptor surface, for example, by changing the setting position of the corona charger into the duct 10.

Referring also to FIG. 4, there is shown, on an enlarged scale, the heating unit 18 which is incorporated in the prevention device W of the invention. The heating unit 18 is intended to heat the photoreceptor surface 2a at comparatively low temperature prior to a copying operation for obtaining a clear transferred image even at an initial stage of each copying, and is disposed below the photoreceptor surface 2a in such a manner that an upward air flow therefrom due to convection surrounds the photoreceptor surface 2a directly or indirectly. The heating unit 18 includes a low temperature heating element 18' placed, by a heat shielding material 21 and an aluminum plate 22 for conducting heat uniformly, on the bottom portion of a casing 20 of approximately U-shaped cross section and secured thereto under pressure by a heat insulating member 23 which is suitably fixed to one side wall of the casing 20. The casing 20 is fixedly mounted on a base plate 19 of the apparatus housing 1a below the photoreceptor drum 2 and is further provided with a protector or grill member 24 disposed at the upper portion thereof for the prevention of fire hazard, should the copy paper sheet hang down during copying operations. The heating element 18' is a penal heating of the temperature self-control type which is capable of maintaining a constant ambient temperature, for example, maintaining the surface temperature of the photoreceptor surface 2a in the range of 40° to 50° C. without employing any control means such as a thermostat or the like.

Referring also to FIGS. 5 and 6, the heating element 18' is connected in parallel to the power source (not shown) through a plug P, with a main motor M being connected in parallel to the heating element 18' through a main switch SW, so that the element 18' is energized upon insertion of the plug P into a receptacle (not shown) leading to the power source irrespective of the main switch SW being turned on or off.

It should be noted here that the circuit construction for the heating element 18' of the invention is not limited to one shown in FIG. 5, but a humidity control switch H.S. such as a humidistat may be further inserted in series with the element 18' for controlling the humidity in the copying apparatus a a predetermined level as is shown in FIG. 6.

Additionally it is desirable that a switch (not shown) which operates contrary to the operation of the main switch SW, or a temperature control means such as a thermostat (not shown) which is disposed near the photoreceptor drum 2 and is actuated by detecting the temperature of the air surrounding the photoreceptor drum 2 is further inserted in series with the element 18' for preventing the photoreceptor drum 2 from overheating.

From the foregoing description, it is seen that, in the copying apparatus of the invention, since the photoreceptor surface 2a is maintained at a temperature level in the range of 40° to 50° C. even when the copying operations are suspended, through the warm air convection, heat radiation and heat conduction from the heating element 18', the disadvantages inherent in the conventional apparatuses such as the disorder of the transferred image due to the reduction of charge holding capacity of the photoreceptor surface arising from absorption of moisture during suspension of copying operations and the like are advantageously eliminated. Needless to say, since the heat from the element 18' is controlled at the low temperature level of 40° to 50° C., sealing material or the like in the copying apparatus is not subjected to deterioration due to heat, aging and deformation while the air maintained in dried state at the initiation of the copying operation is effective for the prevention of formation of wrinkles or curling at the leading edge of the copy paper sheet.

Referring now to FIGS. 7 and 8, there is shown a modification of the heating unit 18 of FIG. 4. In this modification, the heating unit 118 includes a metallic base plate 118a of rectangular shape having opposite ends thereof suitably bent to form L-shaped portions thereat for fixedly supporting the plate 118a in spaced relation to the bottom of the apparatus housing 1a, and a pair of heating elements 118' secured to the lower surface of the base plate 118a through securing plates e fixedly mounted on the elements 118' and corresponding securing screws (not shown). Each of the heating elements 118 further comprises a porcelain casing z of rectangular box-like configuration open at one side to form a cavity therein, and a heating coil h which is wound on a porcelain rod having terminal plates 1 at opposite ends thereof and fixedly embedded in the cavity of the casing z by cement m or the like, with the tips of the terminal plates 1 projecting out of the casing z for electrical connection thereto. Upon energization, the heating elements 118 heat the metallic base plate 118a up to a temperature of approximately 60° C. Since the function and the electrical connections of the heating elements 118 are similar to those described with reference to the element 18 of FIGS. 4, 5 and 6, the detailed description thereof is abbreviated for brevity.

Referring now to FIGS. 9 and 10, in order to assess the effect of harmful gases on a filter, the present inventors carried out a series of experiments employing a testing device T as shown in FIG. 10.

The testing device T includes an L-shaped glass tube 201 having an open enlarged portion, at one end thereof, in which a corona charger Cc connected to a high voltage source HV and an ammeter Am is disposed, and having the other end therefor extending, through a cap $S_1$, into a vessel $b_1$ containing pure water Pw therein, with the extreme tip of said other end immersed in the pure water Pw, a U-shaped glass tube 203 closed at opposite ends thereof and partially filled with active carbon Cf, an L-shaped glass tube 202 having one end thereof extending, through the cap $S_1$, into the vessel $b_1$, with the extreme tip of said one end spaced from the surface of the pure water Pw, and having the other end thereof in communication with one closed end of the U-shaped glass tube 203, an L-shaped glass tube 204 having one end thereof in communication with the other closed end of the U-shaped glass tube 203 and having the other end thereof extending, through a cap $S_2$, into a vessel $b_2$ containing therein an absorbing liquid 1a such as phenolphthalein in an amount of 90 ml with the extreme tip of said other end immersed in the absorbing liquid 1a, and another L-shaped glass tube 205 having one end thereof extending, through the cap $S_2$, into the vessel $b_2$, with the extreme tip of said one end spaced from the surface of said absorbing liquid 1a and having the other end thereof 205a communicated with a suitable air pump (not shown). In the experiments, four kinds of differently treated active carbon specimens (A), (B), (C) and (D) were employed, among which specimens, (A) was an active carbon left in vapor of organic solvent medium for 28 days, (B) was one left in the same vapor for 13 days, (C) was one which had been used for elimination of ozone for 52 hours in the absence of the organic solvent medium vapor, and (D) was one left in a room for 13 days. The air pump (not shown) employed had a flow rate of approximately 1000 ml/min., while the charging current of the corona charger Cc was in the region of 410 to 435 $\mu$A. The active carbons (A), (B), (C) and (D) were tested, one by one, by the device T for the assessment of the ozone eliminating capacity thereof, with sample gases containing predetermined amounts of ozone being passed through the tube 201, the vessel $b_1$, the tube 202, the U-shaped tube 203, the tube 204, the vessel $b_2$ and the tube 205, the results of which are shown in FIG. 9 in graphical form.

As is clear from curves A, B, C and D in FIG. 9 representing behavior of the corresponding active carbons (A), (B), (C) and (D), the ozone eliminating ability of the active carbon filters is greatly deteriorated when such filters are subjected to the vapor of an organic solvent medium.

Referring now to FIG. 11, there is shown another modification of the prevention device W of FIG. 1. In this modification W'', the air duct $D_1$ and $D_2$, and the fan 7 and the louver 17 described as employed in the embodiment of FIG. 1 are dispensed with, and a corona charger 3' disposed adjacent to the photoreceptor surface 2a and having an opening 3'b formed in the casing Du fixedly provided above the developing device C. The casing Du further includes a fan 8' rotatably housed therein in a position adjacent to a closed end thereof, and a partition member d of approximately rectangular cross section fixedly disposed between the charger 3' and the fan 8' within the casing Du, and having one side thereof directed toward the corresponding side wall of the casing 3'a, with the other side thereof located adjacent to the fan 8' being closed. The top wall of the partition member d extending over the casing 3'a of the charger 3' has an opening Su corresponding to the opening 3'b of the casing 3' to allow air flow to pass therethrough, while an air passage a is formed between the top wall of the member d and the inner wall of the casing Du, in which passage $\alpha$, a filter $f_1$ for example, of active carbon is disposed. The bottom wall of the partition member d is spaced from the corresponding bottom portion of the casing Du to define a passage $\beta$ therebetween for circulation of air flow through the passage $\alpha$, thus another opening ex being formed between the corresponding edges of the bottom wall of the member d and the bottom portion of the casing Du adjacent to the photoreceptor surface 2a, which opening ex is communicated with the opening su leading to the passage $\alpha$ through the opening 3'b of the casing 3'a. The opening $O_3$ formed in the apparatus housing 1a is provided with another filter $f_2$ and a fan V mainly for discharging heated gases from the fixing device F and other gases generated in the housing 1a out of the apparatus.

Upon rotation of the fan 8', the air within the casing Du circulates around the partition member d, and any gases present in the charger 3' are drawn, together with the circulating air, from the opening su, through the opening 3'b of the charger 3', the filter $f_1$ in the passage $\alpha$, the passage $\beta$ and the opening ex, back to the opening su, by which arrangement, reaction products due to discharging of the corona charger 3' are continuously eliminated as the same pass through the filter $f_1$, thus the air free from any harmful reaction products being directed toward the photoreceptor surface 2a. Accordingly, disadvantages such as deterioration of the photoreceptor surface 2a, drawing the organic solvent medium vapor from the developing device C into the filter $f_1$ and directing the heated gases from the fixing device F toward the photoreceptor surface 2a are advantageously eliminated.

It is another advantage of the prevention device W'' of FIG. 11 that since the corona charger 3', the filter $f_1$ and the fan 8' are enclosed in the casing Du, with the air being merely circulated within the casing Du, the reaction products due to energization of the corona charger 3' are not discharged out of the apparatus housing 1a, and consequently the amount of harmful products to be exhausted out of the apparatus is almost negligible as compared with that from an apparatus in which such products are directly discharged out of the apparatus. The provision of the separate filter $f_2$ and fan V is particularly effective for evacuating the heated air at the fixing device F, the gases in the apparatus housing 1a and also for removing toner particles in cases where a developing device of the dry type is employed.

It should be noted here that each one of the corona charger 3' and the filter $f_1$ described as employed in the modification of FIG. 11 is not limited to one in number, but that the number, kinds or positions thereof may be suitably changed to meet the purpose within the scope of the invention.

Needless to say the transferred image disturbance prevention device described mainly with reference to the copying apparatus of the wet developing type in the foregoing embodiments is readily applicable to a copying apparatus of the dry developing type with minor alterations in the associated arrangement. Similarly, the transferred image disturbance prevention device described mainly with reference to a copying apparatus of the latent image transfer type in the foregoing embodiments is readily applicable to a copying apparatus of the developed image transfer type.

Although the present invention has been fully described by way of example with reference to the attached drawings, it should be noted that various changes and modifications are apparent to those skilled in the art. Therefore, unless otherwise such changes and modifications depart from the scope of the present invention, they should be construed as included therein.

What is claimed is:

1. An electrophotographic copying apparatus which comprises a rotatable photoreceptor member having a photoconductive surface for repeated formation of an electrostatic latent image of an original thereon, means disposed around said photoreceptor member and including corona charger means for uniformly charging said surface, exposure means for exposing said charged surface to image light of the original through an optical assembly including an illuminating light source so as to form the electrostatic latent image of the original thereon, and means for eliminating harmful gases generated by said corona charger means disposed within the copying apparatus, said means having suction means for drawing away said harmful gases adjacent to the corona charger means and said surface, said suction means including first duct means having one opening adjacent to said corona charger means, and suction fan means connected with said first duct means for generating air flow in the first duct means for drawing said harmful gases generated within said corona charger means through said opening of the first duct means and toward said suction fan, and means for supplying fresh air free from harmful gases toward said photoconductive surface opposed to said corona charger means, said fresh air supplying means including second duct means, one end of the second duct means being adjacent to said photoconductive surface opposed to said corona charger means.

2. An electrophotographic copying apparatus as claimed in claim 1, wherein said apparatus has a housing and said first and second duct means have the other ends opening out of said apparatus housing, whereby said harmful gases sucked by said suction fan means through the one end of said first duct means are evacuated through the other end of the first duct means and air from outside of the apparatus housing is supplied to the photoconductive surface confronting said corona charger means through the second duct means.

3. An electrophotographic copying apparatus which comprises a rotatable photoreceptor member having a photoconductive surface for repeated formation of an electrostatic latent image of an original thereon, means disposed around said photoreceptor member and including corona charger means for uniformly charging said surface, exposure means for exposing said charged surface to image light of the original through an optical assembly including an illuminating light source so as to form the electrostatic latent image of the original thereon, and means for eliminating harmful gases generated by said corona charger means disposed within the copying apparatus, said means having duct means having one end adjacent said photoreceptor member and the other end opening out of the apparatus to the outside thereof and being divided into two portions extending along the length thereof, said corona charger means being in the end of one duct portion adjacent said photoreceptor member, and a line fan adjacent the other end of said duct and positioned relative to the two portions of said duct for drawing gases from around said corona discharge means through said one duct portion toward said line fan and causing fresh air to flow toward the photoreceptor means through the other duct portion during rotation of said line fan.

4. An electrophotographic copying apparatus which comprises a rotatable photoreceptor member having a photoconductive surface for repeated formation of an electrostatic latent image of an original thereon, means disposed around said photoreceptor member and including corona charger means for uniformly charging said surface, exposure means for exposing said charged surface to image light of the original through an optical assembly including an illuminating light source so as to form the electrostatic latent image of the original thereon, and means for eliminating harmful gases generated by said corona charger means disposed within the copying apparatus, said means having suction means for drawing away said harmful gases adjacent to the corona charger means and said surface, said suction means including first duct means having one opening adjacent to said corona charger means, and suction fan means connected with said first duct means for generating air flow in the first duct means for drawing said harmful gases generated within said corona charger means through said opening of the first duct means and toward said suction fan, and a filter means disposed within said first duct means for absorbing said harmful gases from said air flow generated by said suction fan means, and means for supplying fresh air free from harmful gases toward said photoconductive surface opposed to said corona charger means, said fresh air supplying means including second duct means, one end of the second duct means being adjacent to said photoconductive surface opposed to said corona charger means and the other end of said second duct means being connected with the discharge side of said suction fan means, whereby the air flow in the first duct means including said harmful gases is forwarded into the second duct means after passing through said filter means and is supplied to said photoconductive means through said one end of said second duct means.

* * * * *